A. H. KNAPP.
Sheet-Metal Shade-Rollers.
No. 165,935. Patented July 27, 1875.
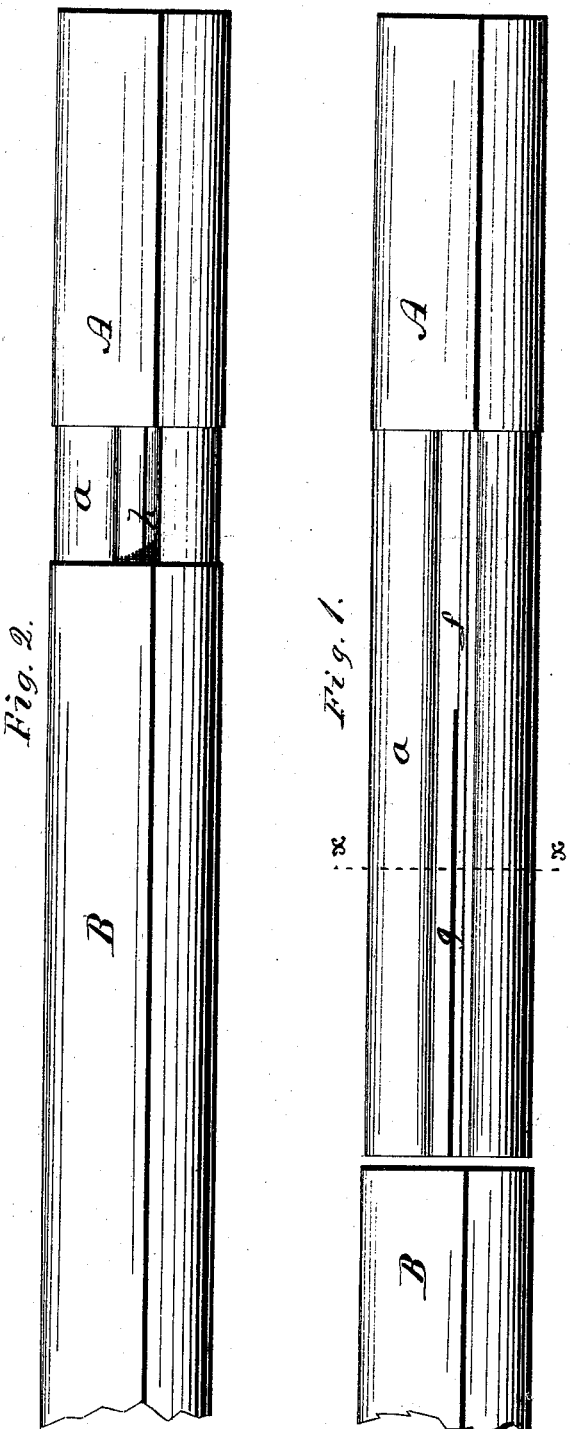

UNITED STATES PATENT OFFICE.

A. HAYDN KNAPP, OF NEWTON, MASSACHUSETTS.

IMPROVEMENT IN SHEET-METAL SHADE-ROLLERS.

Specification forming part of Letters Patent No. 165,935, dated July 27, 1875; application filed April 1, 1875.

*To all whom it may concern:*

Be it known that I, A. HAYDN KNAPP, of Newton, in the county of Middlesex and State of Massachusetts, have invented an Improvement in the Construction of Sheet-Metal Shade-Rollers; and I do hereby declare that the following is a full and exact description thereof, reference being had to the accompanying drawings, making part of this specification—

Figure 1 being a side view of the extension end of a sheet-metal shade-roller constructed with my improvement, the extension part being shown separate from the main part of the roller; Fig. 2, a similar view, the extension-tube being partially inserted in place; Fig. 3, a transverse section of the extension-tube in a plane indicated by the line $x$ $x$, Fig. 1; Fig. 4, a transverse section of the roller and of the extension-tube inserted therein.

Like letters designate corresponding parts in all of the figures.

The extension end A is provided with an extension-tube, $a$, for coupling it to the main part B of the roller. The diameter of the extension-tube $a$ is just sufficient to fit and slide closely into the open end of the main part B, and it is necessary to fit so tightly therein that it will stay in place, whether inserted more or less therein, for adapting the length of the shade-roller to the width of the window. The difficulty lies in constructing the extension-tube so as to fit as tightly as required, and yet be moved readily lengthwise in the roller, and also in giving sufficient strength and firmness to the extension.

My invention consists in soldering together the lapping edges of the extension-tube for a portion of its length from the extension part A of the roller, leaving the remaining part unsoldered and free to spring out and in to give an elastic yielding and adaptation thereof to the tubular roller into which it is inserted, and in forming a deep groove the full length of the extension-tube in one side thereof. This soldering of the extension-tube for about half of its length gives firmness and strength thereto, so that it will not twist and give way, or become detached from the extension end A of the roller, to which it is soldered, while there is sufficient of its length left unsoldered to produce the elasticity requisite for holding it in the main part B of the roller in whatever position therein it may be placed or adjusted. The deep groove in the side of the extension-tube also gives increased strength and firmness thereto, thus obviating completely a great defect of ordinary tubular extension shade-rollers.

In the drawings, the soldered part $f$ of the extension-tube $a$ is indicated by the light longitudinal line in Fig. 1, where the solder is applied. The unsoldered or free part is represented by the heavy line at $g$. The deep groove in the extension is shown at $h$. It is best made where the edges of the metallic plate of which the tube is formed meet and lap by each other. The shade-attaching groove $i$ of the roller fits into this groove of the extension-tube, but does not necessarily fill or fully occupy it, since it may be as large and deep as required to give the requisite rigidity to the tube.

I disclaim outer extension or clamping tubes surrounding a grooved sheet-metal shade-roller, each of said outer tubes having a side opening for the admission of the shade.

What I claim as my invention, and desire to secure by Letters Patent, is—

1. An extension coupling-tube, $a$, of a sheet-metal shade-roller, A B, having the edges of the metallic sheet composing it soldered together for a portion of its length, and the remaining portion thereof unsoldered, substantially as and for the purpose herein specified.

2. The longitudinal groove $h$ in the side of the extension-tube $a$, formed where the edges of the sheet metal composing the tube lap by each other, and embracing both edges, substantially as and for the purpose herein specified.

Specification signed by me this 22d day of February, 1875.

A. H. KNAPP.

Witnesses:
J. S. BROWN,
JAMES SUMNER.